United States Patent [19]

Suyama

[11] Patent Number: 5,546,213
[45] Date of Patent: *Aug. 13, 1996

[54] OPTICAL AMPLIFIER AND OPTICAL COMMUNICATION SYSTEM PROVIDED WITH THE OPTICAL AMPLIFIER

[75] Inventor: Masuo Suyama, Sagamihara, Japan

[73] Assignee: Fujitsu Limited, Kawasaki, Japan

[*] Notice: The term of this patent shall not extend beyond the expiration date of Pat. No. 5,299,048.

[21] Appl. No.: 189,841

[22] Filed: Feb. 1, 1994

Related U.S. Application Data

[63] Continuation of Ser. No. 987,568, Dec. 8, 1992, Pat. No. 5,299,048, which is a continuation of Ser. No. 574,097, Aug. 29, 1990, abandoned.

[30] Foreign Application Priority Data

Aug. 31, 1989 [JP] Japan ................................ 1-223172

[51] Int. Cl.$^6$ ........................... H04B 10/16; H04B 10/00
[52] U.S. Cl. .................... 359/179; 359/134; 359/160; 359/341; 372/6
[58] Field of Search ................................ 359/134, 160, 359/173, 179, 341; 372/6; 385/122

[56] References Cited

U.S. PATENT DOCUMENTS

| | | | |
|---|---|---|---|
| 4,674,830 | 6/1987 | Shaw et al. | 350/96.15 |
| 4,712,075 | 12/1987 | Snitzer | 330/4.3 |
| 4,723,824 | 2/1988 | Shaw et al. | 330/4.3 |

(List continued on next page.)

FOREIGN PATENT DOCUMENTS

| | | | |
|---|---|---|---|
| 0339840 | 11/1989 | European Pat. Off. | 319/134 |
| 0345957 | 12/1989 | European Pat. Off. | 372/6 |
| 55-155901 | 12/1977 | Japan . | |
| 56-144416 | 11/1981 | Japan . | |
| 56-144415 | 11/1981 | Japan . | |
| 56-165437 | 12/1981 | Japan | 455/601 |
| 57-99794 | 6/1982 | Japan . | |
| 58-48513 | 3/1983 | Japan . | |
| 58-53243 | 3/1983 | Japan . | |
| 58-85588 | 5/1983 | Japan . | |
| 58-119241 | 7/1983 | Japan . | |
| 58-115948 | 7/1983 | Japan . | |
| 59-126696 | 7/1984 | Japan | 372/6 |
| 61-75326 | 4/1986 | Japan | 455/612 |
| 63-200632 | 8/1988 | Japan | 455/609 |
| 1-217424 | 8/1989 | Japan . | |
| 4-075036 | 3/1992 | Japan | 359/341 |
| 2227359 | 7/1990 | United Kingdom | 372/6 |
| WO86/07642 | 12/1986 | WIPO . | |

OTHER PUBLICATIONS

Journal Of Lightwave Technology, vol. 6, No. 10, Oct. 1988, "Crosstalk in 1.5–μm InGaAsP Optical Amplifiers", H. E. Lassen et al., pp. 1559–1565.

(List continued on next page.)

Primary Examiner—Leo Boudreau
Assistant Examiner—Kinfe-Michael Negash
Attorney, Agent, or Firm—Staas & Halsey

[57] ABSTRACT

An optical communication system transmits information with a pumping light beam acting as the carrier, and with a signal light beam. This optical communication system includes an optical fiber amplifier adapted to amplify the signal light beam by having the signal light beam and the pumping light beam propagate through a rare-earth-doped fiber doped with a rare-earth element. A modulating circuit modulates the pumping light beam with a high-frequency modulating signal having a period shorter than the life span of fluorescence resulting from an excited state. When the signal light beam and the pumping light beam are propagated in the same direction through the rare-earth-doped fiber, the transmission of information with the pumping light beam acting as the carrier, can provide transmission of a supervisory signal for an optical repeater. When the signal light beam and the pumping light beam are propagated in opposite directions through the rare-earth-doped fiber, a two-way transmission can be achieved by the transmission of information with the signal light beam and the transmission of information with the pumping light beam.

5 Claims, 6 Drawing Sheets

U.S. PATENT DOCUMENTS

| | | | |
|---|---|---|---|
| 4,839,898 | 6/1989 | Payne et al. | 372/6 |
| 4,859,016 | 8/1989 | Shaw et al. | 350/96.15 |
| 4,959,837 | 9/1990 | Fevrier et al. | 372/6 |
| 4,963,832 | 10/1990 | Desurvire et al. | 359/341 |
| 5,005,175 | 4/1991 | DeSurvire et al. | 330/4.3 |
| 5,007,698 | 4/1991 | Sasaki et al. | 370/1 |
| 5,008,887 | 4/1991 | Katka et al. | 372/6 |
| 5,025,142 | 6/1991 | Aoshima et al. | 250/201.9 |
| 5,042,039 | 8/1991 | Edagawa et al. | 372/6 |
| 5,054,876 | 10/1991 | Grasso et al. | 385/24 |
| 5,204,923 | 4/1993 | Grasso et al. | 385/24 |
| 5,210,808 | 5/1993 | Grasso et al. | 385/27.15 |
| 5,229,876 | 7/1993 | Fatehi et al. | 359/160 |
| 5,233,463 | 8/1993 | Grasso et al. | 359/341 |
| 5,268,786 | 12/1993 | Matsushita et al. | 359/341 |
| 5,282,079 | 1/1994 | Laming et al. | 359/341 |
| 5,285,306 | 2/1994 | Heidemann | 359/160 |
| 5,299,048 | 3/1994 | Suyama | 359/179 |
| 5,315,674 | 5/1994 | Asako | 359/177 |
| 5,343,320 | 8/1994 | Anderson | 359/160 |
| 5,374,973 | 12/1994 | Maxham et al. | 359/341 |
| 5,414,554 | 5/1995 | Aoyama | 359/3443 |

OTHER PUBLICATIONS

Journal Of Lightwave Technology, vol. 7, No. 5, May 1989, "Two-State High-Gain Optical Amplifier", N. A. Olsson et al., pp. 791–793.

OFC/IOOC '87, "High-Gain Rare-Earth-Doped Fiber Amplifier at 1.54 μm", R. J Mears et al.

Electronics Letters, vol. 25, No. 14, Jul. 6, 1989, "High-Gain, Broad Spectral Bandwidth Erbium-Doped Fibre Amplifier Pumped Near 1.5 μm", C. G. Atkins et al., pp. 910–911.

ECOC '88, "Noise in Erbium-Doped Fibre Amplifiers", R. I. Laming et al., pp. 54–57.

Electronics Letters, vol. 25, No. 5, Mar. 2, 1989, "1.2 Gbit/s, 218km Transmission Experiment Using In-line Er-Doped Optical Fibre Amplifier", N. Edagawa et al., pp. 363–365.

Electronics Letters, vol. 24, No. 25, Dec., 1988, "Optical Soliton Propagation Using 3GHz Gain-Switched 1.3 μm Laser Diodes", K. Iwatsuki et al., pp. 1572–1574.

Optics Letters, vol. 12, No. 11, Nov. 1987, "High-Gain Erbium-Doped Traveling-Wave Fiber Amplifier", E. Desurvire et al., pp. 888–890.

Electronics Letters, vol. 25, No. 9, Apr. 27, 1989, "Mutual Signal Gain Saturation in $Er^{3+}$-Doped Fibre Amplifier Around 1.54 μm Wavelength", pp. 594–595.

Electronics Letters, vol. 24, No. 1, Jan. 7, 1988, "400 Mbit/s, 372km Coherent Transmission Experiment Using In-line Optical Amplifiers", N. A. Olsson et al., pp. 36–38.

Electronics Letters, vol. 24, No. 1, Jan. 7, 1988, "313 km Transmission Experiment at 1 Gbit/s Using Optical Amplifiers and a Low Chirp Laser", M. G. Oberg et al., pp. 38–39.

Electronics Letters, vol. 24, No. 22, Oct. 27, 1988, "Nose Figure for Erbium-Doped Optical Fibre Amplifiers", R. Olshansky, pp. 1363–1365.

Journal Of Lightwave Technology, vol. 7, No. 4, Apr. 1989, "2-Gbit/s Signal Amplification at μ=1.53 80 m in an Erbium-Doped Single-Mode Fiber Amplifier", C. R. Giles et al., pp. 651–656.

IOOC '89, Jul. 18–21, 1989, Post–Deadline Papers, 20A3–1, "Advances in Active Fibres", D. N. Payne, pp. 1–3.

IOOC '89, Jul. 18–21, 1989, Post–Deadline Papers, 20PDA–7, "An 11 Gb/s, 151km Transmission Experiment Employing a 1480 nm Pumped Erbium-Doped In-Line Fiber Amplifier", M. Z. Iqbal et al., pp. 24–25.

IOOC '89, Jul. 18–21, 1989, Post–Deadline Papers, 20PDA–8, "Transmission of 12 Gb/s Over 100 km Using an LD–Pumped Erbium-Doped Fiber Amplifier and a Ti:LiNbO₃ Mach–Zehnder Modulator", H. Nishimoto et al., pp. 26–27.

IOOC '89 Technical Digest, vol. 4 of 5, Jul. 21, 1989, 21B3–3, "1.8 Gb/s Transmission Over 210km Using an Erbium-Doped Fiber Laser Amplifier with 20 dB Repeater Gain in a Direct Detection System", A. Takada et al., pp. 30–31.

IOOC '89 Technical Digest, vol. 4 of 5, Jul. 21, 1989, 21B4–1, "267 km, 1.2 Gbit/s Optical Transmission Experiment Using Two In-Line LD–Pumped Er–Doped Optical Fiber Amplifiers and an Electroabsorption Modulator", N. Edagawa et al., pp. 32–33.

IOOC '89 Technical Digest, vol. 3 of 5, Jul. 20, 1989, 20A4–3, "Polarization–Independent Gain of $Er^{3+}$-Doped Fiber Amplifier Under Single–Mode Puming", N. Suyama et al., pp. 32–33.

IOOC'89 Technical Digest, vol. 3 of 5, Jul. 20, 1989, 20A4–4, "Transient Gain and Crosstalk Effects in Erbium–Doped Fiber–Amplifiers", C. R. Giles et al., pp. 34–35.

OFC '89, Feb. 6–9, 1989 Post Deadline Papers, PD6–1, "14.4–dB Gain of Erbium–Doped Fiber Amplifier Pumped by 1.49 μm Laser Diode", M. Suyama et al., pp. 1–4.

OFC '89, Feb. 6–9, 1989, Post Deadline Papers, PD15–1, "A 212 km Non–Repeated Transmission Experiment at 1.8 Gb/s Using LD Pumped $Er^{3+}$-Doped Fiber Amplifiers in an IM/Direct–Detection Repeater System", K. Hagimoto et al., pp. 15–1––15–4.

OFC '89, Feb. 6–9, 1989, Technical Digest, vol. 5, TUG5, "Efficient High–Gain Erbium–Doped Fiber Amplifier Pumped with a Frequency–Doubled Nd:YAG Laser", M. C. Farries et al.

OFC '89, Feb. 6–9, 1989, Technical Digest, vol. 5, TUG7, "Saturation–Induced Crosstalk in High–Speed Erbium–Doped Fiber Amplifier at λ=1.53 μm", E. Desurvire et al.

CLEO '89, Apr. 24–28, 1989, Post Deadline Papers, PD20–1 and 20–2, "Efficient Erbium–Doped Fiber Amplifier at λ=1.53 μm with High Output Saturation Power", E. Desurvire et al.

CLEO '89, Apr. 24–28, 1989, Post Deadline Papers, PD22–1 and 22–2, "Performance of an Erbium–Doped Fiber Amplifier in a 16–Channel Coherent Broadcast Network Experiment", R. Welter et al.

CLEO '89, Apr. 24–28, 1989, Technical Digest, vol. 11, WF10, "Studies of Excited State Absorption at 1.5 μm in $Er^{3+}$-Doped Silica Fibers", J. R. Armitage et al., pp. 180–181.

Applied Physics, vol. 24, No. 3, Mar. 1981, "Laser Amplification in an Optical Fiber by Evanescent Field Coupling", N. Periasamy et al., pp. 201–203.

Proceedings Of The IEEE, vol. 57, No. 7, Jul. 1969, "Glass Lasers", C. G. Young, pp. 1267–1289.

Electronics Letters, Sep. 29, 1983, vol. 19, No. 20, "Evanescent Amplification in a Single–Mode Optical Fibre", W. V. Sorin et al., pp. 820–822.

Applied Physics Letters, vol. 23, No. 7, Oct. 1, 1973, "Neodymium–Doped Silica Lasers in End–Pumped Fiber Geometry", J. Stone et al., pp. 388–389.

Applied Optics, vol. 13, No. 6, Jun. 1974, "Neodymium-Doped Fiber Lasers: Room Temperature cw Operation with an Injection Laser Pump", J. Stone et al., pp. 1256–1258.

IEEE Journal Of Quantum Electronics, vol. QE–2, No. 9, Sep. 1966, "9A4–Laser Action by Enhanced Total Internal Reflection", C. J. Koester, pp. 580–584.

The Institute Of Electronics, Information And Communication Engineers Technical Report, vol. 88, No. 416, OQE88–123, Feb. 1, 1989, "Amplification Characteristics of Er–Doped Optical Fiber Amplifiers", N. Edagawa et al., pp. 85–90.

The Institute Of Electronics, Information And Communication Engineers Technical Report, vol. 89, No. 48, OQE89–18, May 22, 1989, "Optical Amplification Characteristics of Erbium–Doped Fiber", M. Suyama et al., pp. 55–60.

The Institute Of Electronics, Information And Communication Engineers Technical Report, vol. 89, No. 32, OCS89–3, May 18, 1989, "A Study of Long Span Gigabit/s Optical Transmission Systems Using Fiber Amplifiers", K. Hagimoto et al., pp. 13–20.

The Institute Of Electronics, Information And Communication Engineers Technical Report, vol. 89, No. 32, OCS89–4, May 18, 1989, "Optical Amplifier Using Rare–Earth Doped Fibers", K. Nakamura et al., pp. 21–27.

CLEO '88, Apr. 25–29, 1988, Post Deadline Papers, PD9–1, "Characterization of High–Spped Signal Amplification at $\lambda$=1.53 μm in an Erbium–Doped Single–Mode Fiber", C. R. Giles et al., pp. 473–476.

CLEO '88, Apr. 25–29, 1988, Technical Digest, vol. 7, THH4, "Gain and Excited–State Absorption in Neodymium–Doped Optical Fiber Laser", P. R. Morkel et al., pp. 320–321.

Patent Abstracts Of Japan, vol. 10, No. 247 (P–490) (2303) 26 Aug. 1986 & JP–A–61 075 326 (NEC).

WO–A–8 607 642 (British Telecommunications) *abstract; FIGS. 103, p. 4, line 22–33*.

Electronics Letters, vol. 25, No. 17, Aug. 17, 1989, "Amplification of Mode–Locked Semiconductor Diode Laser Pulses in Erbium–Doped Fibre Amplifier", Baker et al., pp. 1131–1133.

Electronics Letters, vol. 25, No. 14, Jul. 6, 1989, "16–Channel Optical FDM Distribution/Transmission Experiment Utilising ER3+–Doped Fibre Amplifier", Toba et al., pp. 885–887.

Electronics Letters, vol. 25, No. 10, May 11, 1989, "250 KM Nonrepeated Transmission Experiment at 1.8 Gb/s Using LD Pumped ER3+–Doped Fibre Amplifiers in IM/Direct Detection System", K. Hagimoto et al., pp. 662–664.

Patent Abstracts Of Japan, vol. 008, No. 219 (P–306), Oct. 5, 1984 & JP–A–59 101629 (Nippon Denki KK), Jun. 12, 1984, *abstract*.

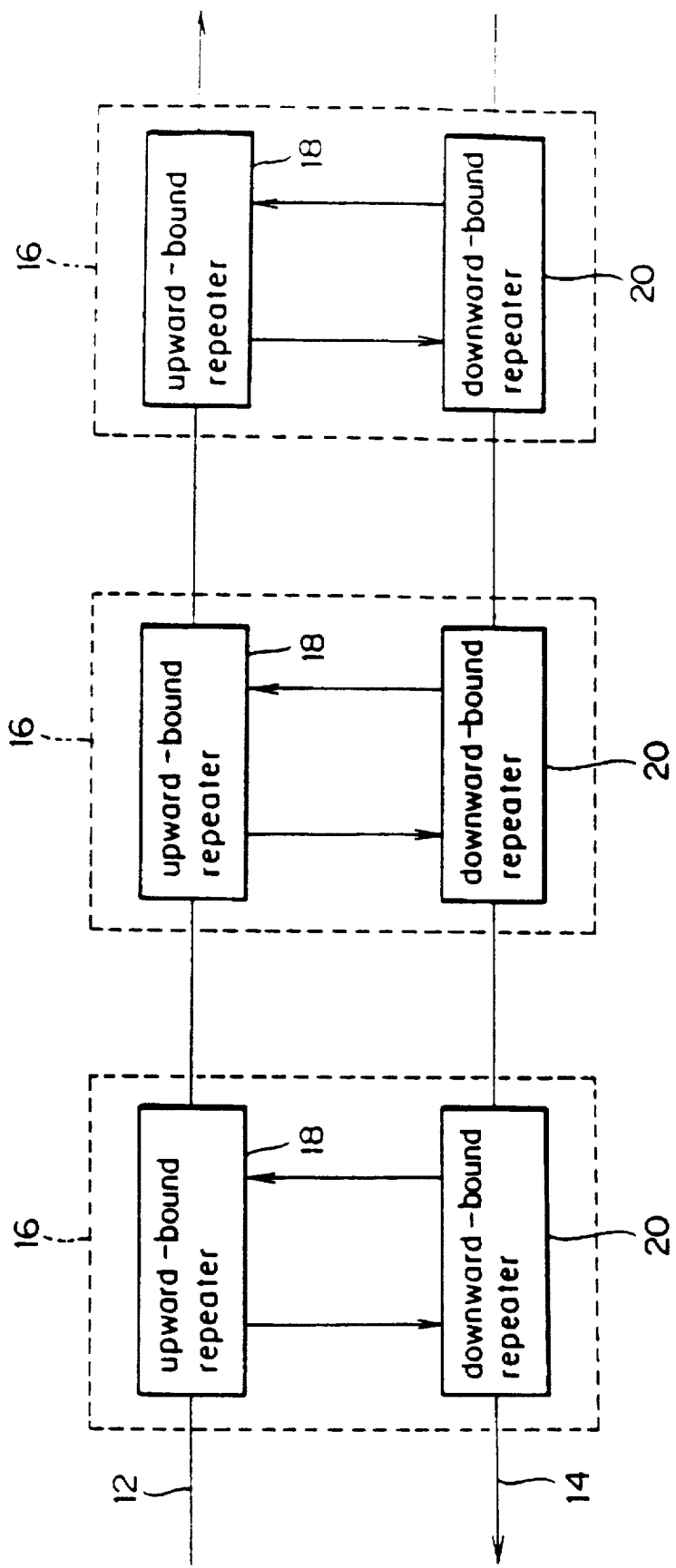
F I G. 5

OPTICAL AMPLIFIER AND OPTICAL COMMUNICATION SYSTEM PROVIDED WITH THE OPTICAL AMPLIFIER

CROSS-REFERENCE TO RELATED APPLICATIONS

This application is a continuation of application Ser. No. 07/987,568, filed Dec. 8, 1992, now U.S. Pat. No. 5,299,048, which is a continuation of application Ser. No. 07/574,097, filed Aug. 29, 1990, now abandoned. This application is also related to application Ser. Nos. 08/400,755; 08/400,760; 08/400,761 and 08/400,762, all filed Mar. 8, 1995.

BACKGROUND OF THE INVENTION

The present invention relates to an optical communication system provided with an optical fiber amplifier and, more particularly, to an optical communication system provided with an optical fiber amplifier constituted of a rare-earth-doped fiber which is doped with a rare earth element.

Optical amplifiers capable of amplifying an optical signal directly, without using an electric circuit, are being intensively studied in many research institutions as a key device in the optical communication system of the future because of their bit-rate-free characteristic, ability to provide large capacity, and capability of amplifying multiple channels en bloc. As optical communication systems including such optical amplifiers, there are proposed those that employ the optical amplifier as an optical power booster for compensating for branching or insertion loss and increasing the transmission power, those that use the optical amplifier as an optical preamplifier for improvement of reception sensitivity, those that use the optical amplifier as an optical repeater, whereby miniaturization of the repeater is achieved and reliability of the repeater is enhanced, and so on. Research is being conducted for optimized arrangement of such systems.

Optical amplifiers, which are the objects of the research conducted so far, are broadly classified into: (a) amplifiers using an optical fiber doped with a rare earth element such as Er, Nd, and Yb (hereinafter referred to as "rare-earth-doped fiber", wherein this term covers a wide range of waveguide structures including a waveguide doped with a rare earth element); (b) semiconductor laser type amplifiers; and (c) amplifiers which make use of the non-linearity within an optical fiber. Of these, the optical amplifier (a) above, i.e., one that uses a rare-earth-doped fiber, has a number of advantageous characteristics, such as polarization independence, low noise production, and a small loss at its coupling with the transmission line.

When an optical amplifier is used as an optical repeater, a supervisory control function for the optical amplifier is indispensable. As a supervisory system applicable to the optical amplifier (b) above, i.e., the semiconductor laser type, there is known a system disclosed, for example, in Ellis, A. D. et al.: *Supervisory System for Cascaded Semiconductor Laser Amplifier Repeaters, Electron.* Lett., Vol. 25, No. 5, pp. 309–311 (2nd Mar. 1989). Since in this system the injection current to the semiconductor laser type optical amplifier is detected therein, the same system cannot be applied to the optical communication system provided with an optical fiber amplifier. In other words, there is no prior art supervisory control system which is suitable for optical fiber amplifiers.

SUMMARY OF THE INVENTION

An optical communication system provided with an optical fiber amplifier uses a pumping light beam to effect optical amplification. Hence, if transmission of information using the pumping light beam can be performed in the system in addition to transmission of information with a signal light beam, then, it becomes possible to have supervisory control performed in the optical communication system provided with the optical fiber amplifier as an optical repeater. The optical amplification of a signal light beam is effected not only when a pumping light beam introduced into a rare-earth-doped fiber propagates in the same direction as the signal light beam but also when it propagates in a direction opposite to the signal light beam. Therefore, if transmission of information is possible with the use of the pumping light beam, it becomes possible to achieve a two-way transmission by making use of such characteristics.

Accordingly, an object of the present invention is to provide an optical communication system having an optical fiber amplifier capable of transmission of information with a signal light beam, in addition to transmission of information with a signal light beam.

In accordance with an aspect of the present invention, there is provided an optical communication system having an optical repeater including an optical fiber amplifier adapted to amplify a signal light beam by having the signal light beam and a pumping light beam propagated through the rare-earth-doped fiber of the optical element, which is doped with a rare earth element. This system includes a pumping light source for emitting the pumping light beam, and means for modulating the pumping light beam with a high-frequency modulating signal having a period shorter than the life span of fluorescence resulting from an excited state, whereby transmission of information with the pumping light beam acting as a carrier, and transmission of information with the signal light beam made are achievable.

Since in the present invention the pumping light beam is modulated by a high-frequency modulating signal with a period shorter than the life span of the fluorescence resulting from an excited state, achieving transmission of information with the pumping light beam, in addition to transmission of information with the signal light beam, without adversely affecting the amplification of the signal light beam by the pumping light beam is possible. Consequently, in the case where the signal light beam and the pumping light beam are arranged to be propagated in the same direction through the rare-earth-doped fiber, the transmission of a supervisory signal for an optical repeater can be readily achieved by using the pumping light beam as the carrier.

In the case where the signal light beam and the pumping light beam are arranged to be propagated in opposite directions through the rare-earth-doped fiber, a two-way transmission can be achieved by transmission of information with the signal light beam and transmission of information with the pumping light beam. The transmission of information with the pumping light beam includes a supervisory signal transmission for an optical repeater.

The above and other objects, features and advantages of the present invention and the manner of realizing them will become more apparent, and the invention itself will best be understood from a study of the following description and appended claims, with reference to the attached drawings which show some preferred embodiments of the invention.

BRIEF DESCRIPTION OF THE DRAWINGS

FIG. 5 is a block diagram of an optical repeater unit according to an embodiment of the present invention;

DESCRIPTION OF THE PREFERRED EMBODIMENTS

Figure 1:
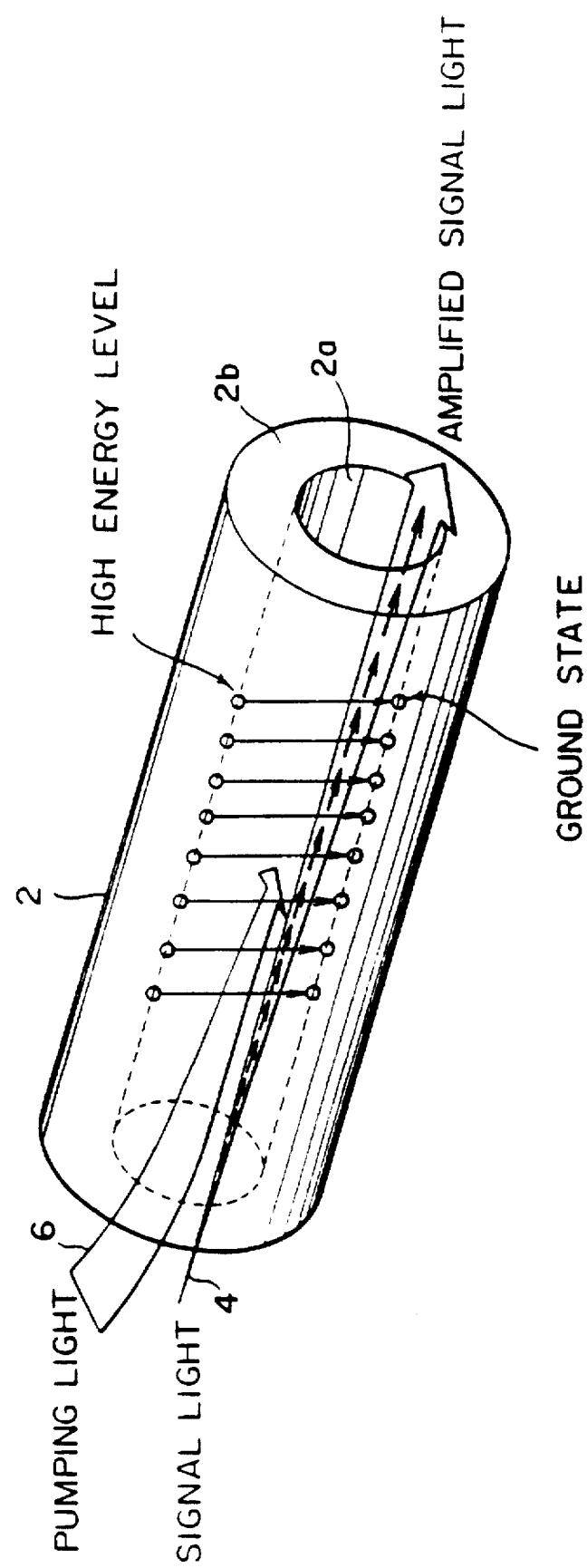
FIG. 1 is a schematic diagram showing the principle of optical amplification effected by a rare-earth-doped fiber.

FIG. 1 illustrates the principle of optical amplification by means of a rare-earth-doped fiber. Reference numeral 2 denotes a rare-earth-doped fiber formed of a core 2a and a clad 2b, of which the core 2a is doped with a rare earth element such as erbium (Er). When a pumping light beam is led into such a rare-earth-doped fiber 2, the rare earth atoms are excited to a high energy level. When a signal light beam is allowed to impinge on the rare earth atoms excited to the high energy level within the optical fiber 2, stimulated emission of light takes place, causing transition of the rare earth atoms to the ground state. As a result, the intensity of the signal light beam is progressively increased along the optical fiber, and thus, amplification of the signal light beam is effected.

In the case where the doped rare earth element is erbium (Er), a laser beam whose wavelength is 1.49 μm band, for example, can be used as the pumping light beam when the signal light beam with a wavelength of 1.55 μm band is to be amplified. In the case where the doped rare earth element is neodymium (Nd), a laser beam whose wavelength is 0.8 μm band, for example, can be used as the pumping light beam when the signal light beam with a wavelength of 1.3 μm band is to be amplified. A description of the present invention, provided below, assumes that the doped rare earth element is erbium.

Figure 2:
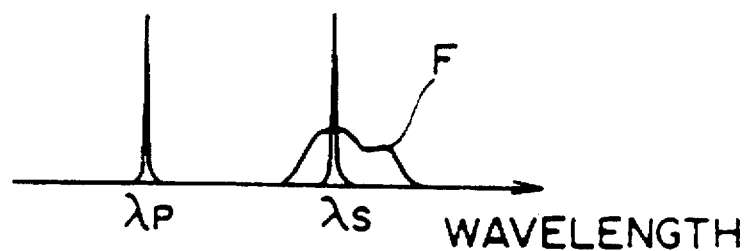
FIG. 2 is a graph illustrating fluorescence.
Figure 3:
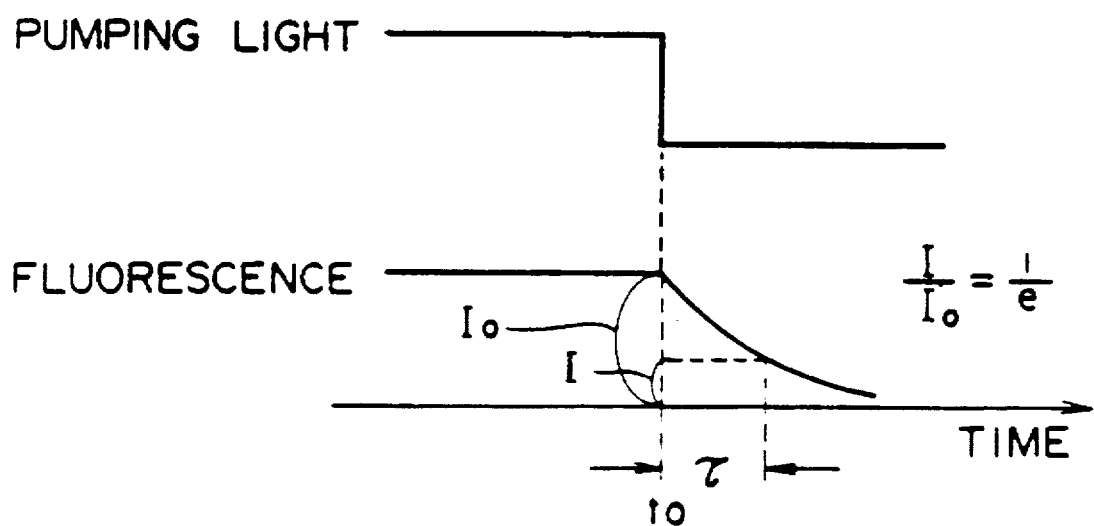
FIG. 3 is a graph of the life span of fluorescence.

When a pumping light beam with a wavelength λP is led into a rare-earth-doped fiber through which a signal light beam with a wavelength λs is being propagated, the wavelength λP being in a predetermined wavelength relationship with the wavelength λs, produces fluorescence. The spectrum of the fluorescence is illustrated by character F in FIG. 2 within the rare-earth-doped fiber in the vicinity of the spectrum of the signal light beam. The variation in the intensity of the fluorescence with time is not completely coincident with the variation in the intensity of the pumping light beam with time. That is, as shown in FIG. 3, if the introduction of the pumping light beam is stopped at time $t_0$, the intensity of the fluorescence does not become zero instantly, but it gradually decreases over a certain time constant. When the life span of fluorescence is defined as the time τ which is taken for the intensity I of the fluorescence to decrease from its value $I_o$ obtainable before the introduction of the pumping light beam is stopped to 1/e of $I_o$ (where e is the base of the natural logarithm), it is known that, even if the introduction of the pumping light beam is stopped, the amplification action for the signal light beam is maintained without causing unstable variations in the gain for a period of time within the range from the point of time $t_0$ to, approximately, when the life span of fluorescence τ elapses (Laming, R. I. et al .: *Multi-channel Crosstalk and Pump Noise Characterization of $Er^{3+}$-doped Fibre Amplifier Pumped at 980 nm*, Electron. Lett., Vol. 25, No. 7, pp. 455–456 (30th Mar. 1989)) .

Accordingly, when a pumping light beam is modulated by a high-frequency modulating signal whose period is shorter than the life span of fluorescence resulting from the excited state or thereabout, the modulation does not have an adverse effect on the amplification of the signal light beam.

Figure 4A:
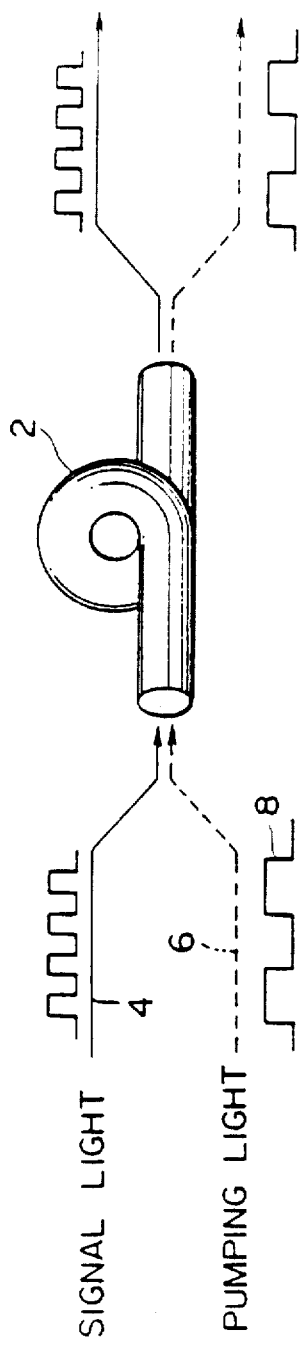
FIG. 4A is a diagram illustrating the principle of the present invention in the case where the signal light beam and the pumping light beam propagate in the same direction.
Figure 4B:
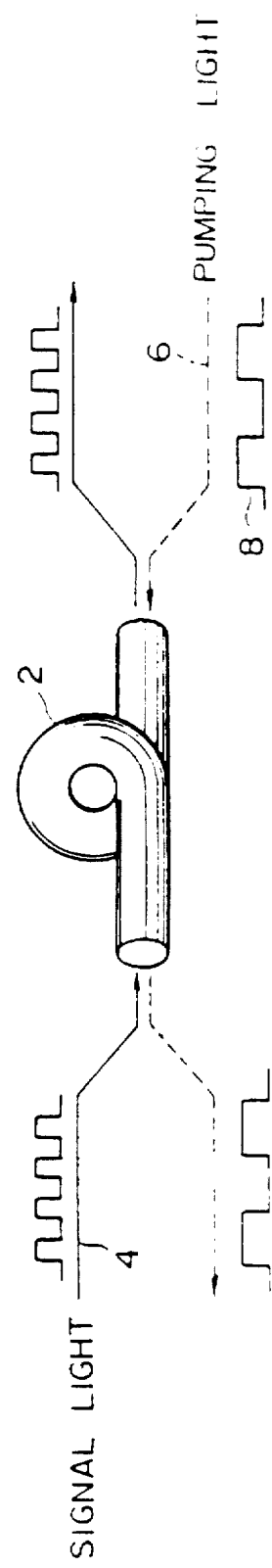
FIG. 4B is a diagram illustrating the principle of the present invention in the case where the signal light beam and the pumping light beam propagate in opposite directions.

Referring to FIG. 4A and FIG. 4B, FIG. 4A is used to illustrate the principle of the present invention in the case where the signal light beam and the pumping light beam are propagated in the same direction through a rare-earth-doped fiber. FIG. 4B is used to illustrate the principle of the present invention for the case where the signal light beam and the pumping light beam are propagated in opposite directions through a rare-earth-doped fiber.

The system of the present invention is such that, in an optical communication system provided with an optical fiber amplifier for amplifying a signal light beam 4 by having the signal light beam 4 and a pumping light beam 6 propagated through a rare-earth-doped fiber 2 which is doped with a rare earth element, the pumping light beam 6 is modulated by a high-frequency modulating signal 8 with a period shorter than the life span of fluorescence resulting from an excited state or thereabout, such that transmission of information with the pumping beam 6 acting as a carrier, in addition to transmission of information with the signal light beam 4, is achievable.

Here, the rare-earth-doped fiber 2 has, as described above, a wide meaning that covers general waveguide structures such as waveguides doped with a rare earth element. Therefore, an optical fiber amplifier which achieves amplification of a signal light beam by propagating the signal light beam together with a pumping light beam through a rare-earth-doped fiber doped with a rare earth element, covers not only optical amplifiers which use optical fibers as propagating media of light but also optical amplifiers which use optical waveguide structures such as optical waveguides, as propagating media of light.

When the signal light beam and the pumping light beam are propagated in the same direction through the rare-earth-doped fiber as shown in FIG. 4A, transmission of a supervisory signal for the optical repeater with the pumping light beam acting as the carrier can be achieved.

On the other hand, when the signal light beam and the pumping light beam are propagated in opposite directions through the rare-earth-doped fiber, as shown in FIG. 4B, a two-way transmission including transmission of information with the signal light beam and transmission of information with the pumping light beam acting as the carrier, can be achieved.

FIG. 5 is a diagram of an optical repeater unit with the present invention applied thereto. The drawing shows a system of two-way optical transmission lines formed of an upward-bound optical transmission line 12 and a downward-bound optical transmission line 14 with a single or a plurality (three in the illustrated case) of optical repeater units 16 provided along the two-way optical transmission lines. Each optical repeater unit 16 includes an upward-bound repeater 18 connected with the upward-bound optical transmission line 12 and a downward-bound repeater 20 connected with the downward-bound optical transmission line 14. The upward-bound repeaters 18 and downward-bound repeaters 20 perform communication of supervisory information therebetween for achieving a supervisory control function for the optical repeater units 16 in addition to general repeater functions. While the communication of the supervisory information between the upward-bound and downward-bound repeaters 18 and 20 is achieved by means of electric signals, the transmission of supervisory information through the optical transmission lines 12 and 14 is achieved by means of pumping light beams propagated through rare-earth-doped fibers included in the optical repeater units 16.

Figure 6:
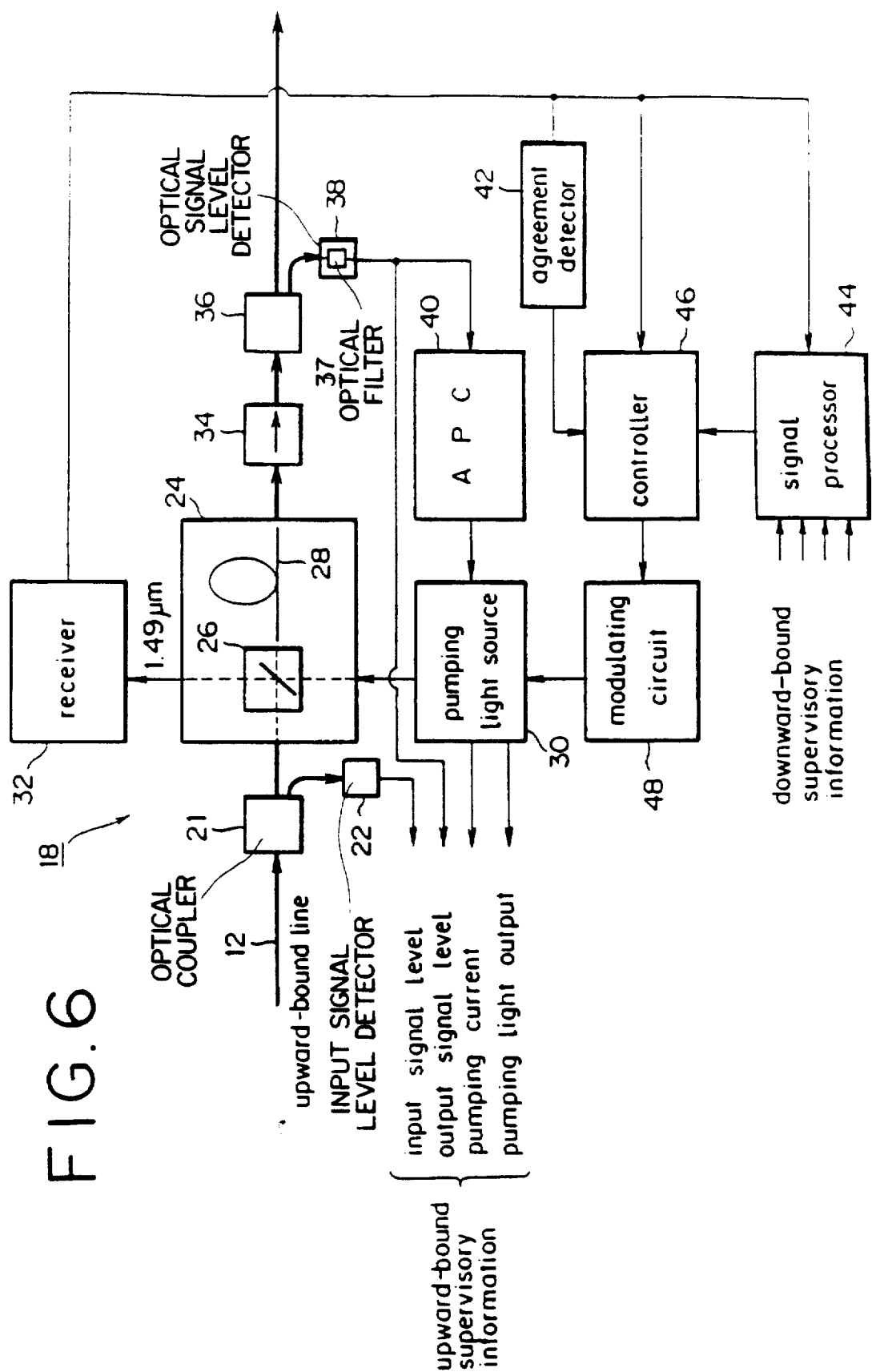
FIG. 6 is a block diagram of an upward-bound repeater according to an embodiment of the present invention.

FIG. 6 is a block diagram of the upward-bound repeater 18. The downward-bound repeater 20 has the same block structure as the upward-bound repeater 18. Referring to FIG. 6, the wavelength of the signal light beam propagated through the upward-bound optical transmission line 12 is 1.536 μm, or 1.552 μm, for example, and the wavelength of the pumping light beam is 1.49 μm, for example. The portion of the pumping light beam which has not contributed to the optical amplification arrives at an upward-bound repeater 18. The signal light beam and the pumping light beam are split by an optical coupler 21 into portions in a ratio of 1:100, for example. The smaller split portion of the beams is input to an input signal level detector 22 for level detection of the signal light beam. The larger split portion of the beams is input to an optical fiber amplifier 24.

The optical fiber amplifier 24 comprises a dichroic coupler 26 and a rare-earth-doped fiber 28 with its core doped with erbium. The dichroic coupler 26 splits the beams from the optical coupler 21 into the signal light beam and the pumping light beam, and leads the signal light beam into the rare-earth-doped fiber 28 and the pumping light beam into a receiver 32. The dichroic coupler 26 further reflects a pumping light beam from a pumping light source 30 into the rare-earth-doped fiber 28.

The signal light beam amplified by the optical fiber amplifier 24 and the portion of the pumping light beam not consumed in the amplification of the signal light beam together are input to an optical coupler 36 through an optical isolator 34. The optical isolator 34 is provided for preventing oscillation from occurring due to gain of the rare-earth-doped fiber 28 as the result of formation of a resonator structure in the optical path including the rare-earth-doped fiber 28. The optical coupler 36 splits the input signal light beam and pumping light beam into portions in the ratio of 1:100, of which the larger split portions of the beams are reintroduced into the upward-bound optical transmission line 12 and the smaller split portions of the beams are input to an output signal level detector 38. The output signal level detector 38 suppresses the pumping light beam by means of an optical filter 37 incorporated therein, and detects the level of the amplified signal light beam.

The pumping light source 30 is formed by a semiconductor laser in the present embodiment, and the intensity of the pumping light beam output therefrom (or the average value thereof) is controlled so that the level of the above-described output signal may become constant by means of an automatic power control (APC) circuit 40 depending on the signal output from the output signal level detector 38. By virtue of the above-described control, it becomes possible to hold the signal light beam output from the upward-bound repeater 18 at a constant level at all times, regardless of the level of the signal light beam input to the upward-bound repeater 18.

The input signal level from the input signal level detector 22, the output signal level from the output signal level detector 38, the pumping current (the bias current for the semiconductor laser) in the pumping light source 30, and the pumping light output from the same are delivered to the downward-bound repeater 20 as upward-bound supervisory information. This upward-bound supervisory information is delivered to the downward-bound optical transmission line 14 by modulating the pumping light beam (also refer to FIG. 5).

On the other hand, downward-bound supervisory information is accepted by the upward-bound repeater 18 through a signal processor 44 and the pumping light beam from the pumping light source 30 is modulated by the downward-bound supervisory information. Thus, the downward-bound supervisory information is transmitted through the upward-bound optical transmission line 12.

The detailed operation of the above will now be described. A delivery command of the downward-bound supervisory information to the upward-bound repeater 18 is received by the receiver 32 of the upward-bound repeater 18. The receiver 32 decodes the command and informs a controller 46 of the decoded command. This decoding can be achieved by subjecting the address information received by the receiver 32 to detection performed in an agreement detector 42, to determine whether the address information is in agreement with address information stored therein in advance. The controller 46, upon receipt of the delivery command of the supervisory information, controls a modulating circuit 48 depending on the downward-bound supervisory information from the signal processor 44. As a result, the pumping light beam from the pumping light source 30 is intensity-modulated, for example. By arranging the modulation speed at this time to be sufficiently higher than the reciprocal of the life span of the fluorescence in the rare-earth-doped fiber 28, even if the pumping light beam from the pumping light source 30 is modulated, the modulation component hardly appears in the signal light beam amplified in and delivered from the upward-bound repeater 18. Thus, it becomes possible to achieve transmission of supervisory information carried by the pumping light beam which acts as the carrier in addition to transmission of information with the signal light beam that is directly amplified. When both sets of address information are not in agreement as determined by the agreement detector 42 and, therefore, there is no necessity for delivering the downward-bound supervisory information to the upward-bound optical transmission line 12, the supervisory information carried by the pumping light beam accepted from the preceding stage by the receiver 32 is caused to be reproduced and amplified by the controller 46. The thus obtained information is used for modulating the pumping light source 30.

Figure 7:
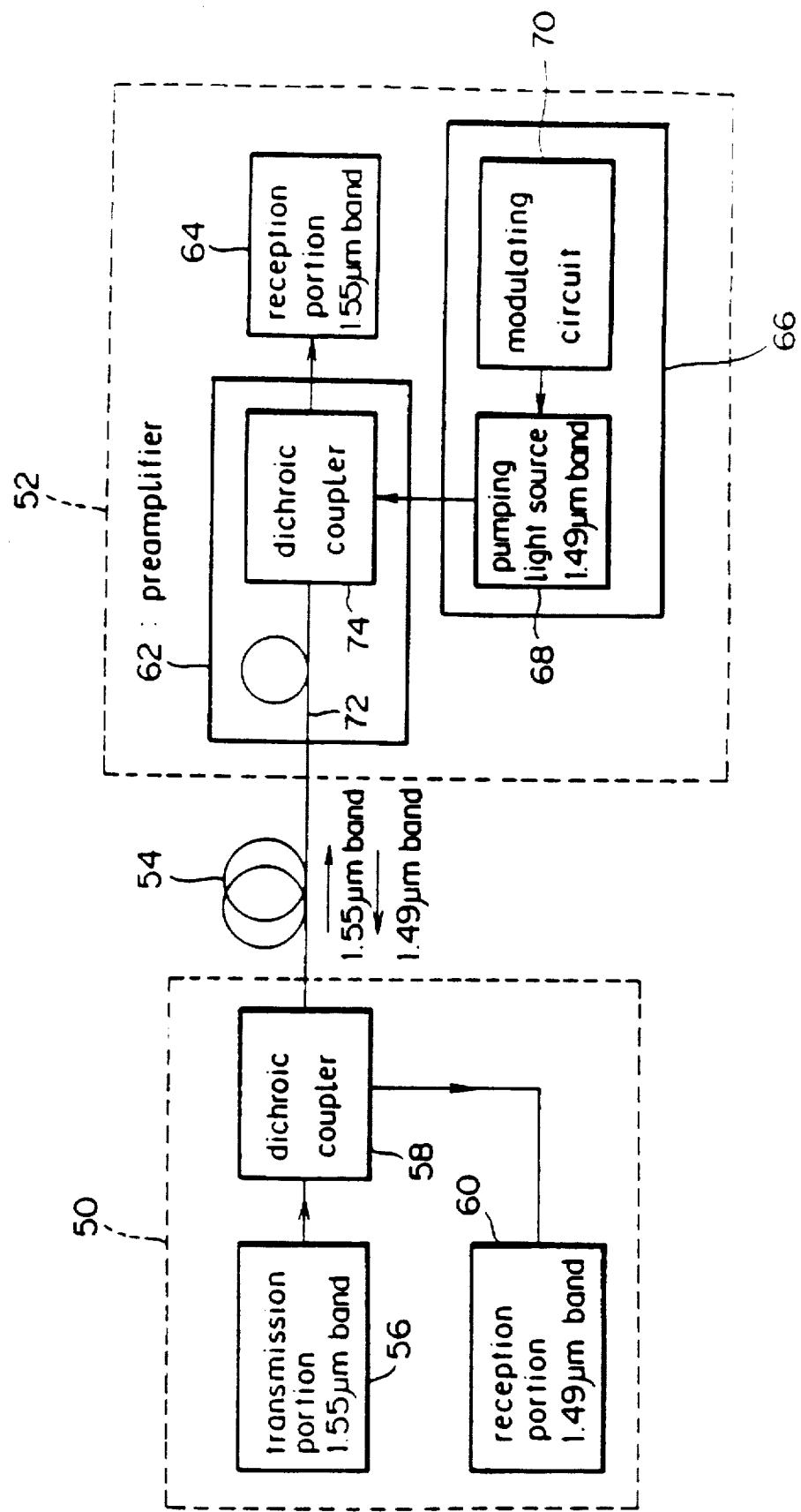
FIG. 7 is a block diagram of a two-way transmission system according to an embodiment of the present invention.

FIG. 7 is a block diagram showing an arrangement of a two-way transmission system with the present invention applied thereto. This system has a first terminal station 50 and a second terminal station 52 connected through a single optical fiber 54 to achieve the two-way transmission. The first terminal station 50 comprises a transmission portion 56 for transmitting a signal light of 1.55 μm band, a reception portion for receiving a modulated pumping light beam of 1.49 μm band, and a dichroic coupler 58. The second terminal station 52 comprises a preamplifier 62, a reception portion 64 for receiving the signal light beam of 1.55 μm band, and a transmission portion 66 for modulating and transmitting the pumping light beam of 1.49 μm band. The transmission portion 66 includes a pumping light source 68 and a modulating circuit 70 for intensity-modulating the semiconductor laser of the pumping light source 68. The preamplifier 62 includes a rare-earth-doped fiber 72 connected to the optical fiber 54 and a dichroic coupler 74 for both leading the modulated pumping light beam into the rare-earth-doped fiber 72 and delivering the signal light beam amplified by the rare-earth-doped fiber 72 to the reception portion 64.

The signal light beam from the transmission portion 56 of the first terminal station 50 is delivered to the optical fiber 54 through the dichroic coupler 58 and, then, amplified by the preamplifier 62 of the second terminal station 52 and received by the reception portion 64. At this time, since the signal light beam is amplified by the preamplifier 62 (optical fiber amplifier), the reception sensitivity is enhanced. On the other hand, the modulated pumping light beam delivered from the transmission portion 66 of the second terminal station 52, contributes to the amplification of the signal light beam from the first terminal station 50 without producing any effect on the signal light beam, even though the pumping light beam is modulated. The modulated pumping light beam is transmitted to the first terminal station 50 through the optical fiber 54 and is accepted by the reception portion 60 so that the transmitted information is reproduced therein.

Since the signal light beam and the pumping light beam are adapted to be propagated in opposite directions through the rare-earth-doped fiber 72, two-way transmission is achieved by the transmission of information with the signal light beam and by the transmission of information with the pumping light beam acting as a carrier.

The modulation of the pumping light source 68 in the transmission portion 66 of the second terminal station 52 is performed in the same manner as in the embodiment described with reference to FIG. 5 and FIG. 6, that is, by a high-frequency modulating signal having a period shorter than the life span of fluorescence resulting from the excited state in the rare-earth-doped fiber or thereabout.

In the case where the rare-earth-doped fiber is doped with erbium as the rare earth element, the life span of fluorescence resulting from the excited state is approximately 14 ms, for example, and, hence, a practically sufficient transmission capacity can be obtained.

What is claimed is:

1. An optical repeater in an optical transmission line, comprising:

an optical fiber amplifier including a rare-earth-doped fiber;

means for receiving a signal light beam, modulated by a first information signal, from the optical transmission line and inputting the signal light beam to said optical fiber amplifier;

a pumping light source emitting a pumping light beam;

means for modulating the pumping light beam with a second information signal;

means for inputting the modulated pumping light beam to said optical fiber amplifier; and means for inputting the signal light beam propagated through said optical fiber amplifier to the optical transmission line.

2. An optical amplifier between optical transmission media, comprising:

an optical fiber amplifier including a rare-earth doped fiber;

means for receiving a signal light beam, modulated by a first information signal, from an optical transmission medium and inputting the signal light beam to said optical fiber amplifier;

a pumping light source emitting a pumping light beam;

means for modulating the pumping light beam with a second information signal;

means for inputting the modulated pumping light beam to said optical fiber amplifier; and means for inputting the signal light beam propagated through said optical fiber amplifier to another optical transmission medium.

3. An optical amplifier between optical transmission media, comprising:

a pumping light source emitting a pumping light beam;

a modulator modulating the pumping light beam with a first information signal; and an optical fiber amplifier, including a rare-earth doped fiber, for receiving a signal light beam modulated by a second information from the optical transmission medium and the pumping light beam, and for outputting the signal light beam propagated therethrough to another optical transmission medium.

4. The optical amplifier according to claim 3, further comprising:

an optical coupler, operatively connected to said optical fiber amplifier, and splitting the output of said optical amplifier into portions in a predetermined ratio;

an optical filter, operatively connected to said optical coupler, for removing a pumping light beam component from one of the split portions of the output; and a gain controller, operatively connected to said optical filter means, for controlling an average value of power of the pumping light source to provide the output of the signal light beam at a predetermined value.

5. A method of amplifying an optical signal from an optical transmission medium, comprising the steps of:

receiving an optical signal modulated by a first information signal, from the optical transmission medium;

inputting the optical signal to an optical fiber amplifier including a rare-earth doped fiber;

modulating a pumping light emitted by a pumping light source with a second information signal;

inputting the modulated pumping light to the optical fiber amplifier; and outputting the optical signal propagated through the optical fiber amplifier to another optical transmission medium.

* * * * *

UNITED STATES PATENT AND TRADEMARK OFFICE
CERTIFICATE OF CORRECTION

PATENT NO. : 5,546,213
DATED : August 13, 1996
INVENTOR(S) : Suyama

It is certified that error appears in the above-indentified patent and that said Letters Patent is hereby corrected as shown below:

On cover page,

Page 2, Column 1
    Line 54, "Nose" should be --Noise--;
    Line 58, "$\mu = 1.53\ 80m$" should be --$\lambda = 1.53 \mu m$--.

Page 2, Column 2
    Line 22, "Puming" should be --Pumping--;

Page 3, Column 1

Line 3, "-Doped" should be --Doped--.

Column 3
    Line 49, "As" should be --$\lambda$s--

Signed and Sealed this

Thirty-first Day of December, 1996

Attest:

BRUCE LEHMAN

Attesting Officer      *Commissioner of Patents and Trademarks*